(12) United States Patent
Choi

(10) Patent No.: US 7,890,678 B2
(45) Date of Patent: Feb. 15, 2011

(54) PORTABLE COMPUTER HAVING AUXILIARY IO APPARATUS AND SYSTEM SETUP METHOD THEREOF

(75) Inventor: Dang-Woo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 12/212,371

(22) Filed: Sep. 17, 2008

(65) Prior Publication Data

US 2009/0094402 A1  Apr. 9, 2009

(30) Foreign Application Priority Data

Oct. 5, 2007  (KR) .................. 10-2007-0100438

(51) Int. Cl.
  *G06F 13/12* (2006.01)
  *G06F 3/00* (2006.01)
  *G06F 9/00* (2006.01)
  *G06F 1/00* (2006.01)

(52) U.S. Cl. .................. 710/62; 710/14; 710/15; 713/1; 713/300

(58) Field of Classification Search .................. None
See application file for complete search history.

(56) References Cited

U.S. PATENT DOCUMENTS

2007/0239921 A1 * 10/2007 Toorians et al. ............. 710/306

\* cited by examiner

*Primary Examiner*—Alan Chen
(74) *Attorney, Agent, or Firm*—Birch, Stewart, Kolasch & Birch, LLP

(57) ABSTRACT

A portable computer including an auxiliary Input/Output (IO) apparatus, a main controller configured to control the portable computer, a peripheral module configured to perform an individual function of the portable computer, an auxiliary Input/Output (IO) apparatus including a control unit configured to selectively control the peripheral module and being driven by its own operating system (OS), and an embedded controller (EC) configured to sense an operation mode of the portable computer from a Basic Input/Output System (BIOS) and to determine whether the main controller or the control unit of the auxiliary IO apparatus is to control the peripheral apparatus based on the sensed operation mode the of the portable computer.

9 Claims, 6 Drawing Sheets

FIG. 4

| System mode \ Module | Wireless LAN module | Wired LAN module | HDD | Speaker | ... |
|---|---|---|---|---|---|
| S0 | Main system | Main system | Main system | Main system | ... |
| S1 | Main system | Main system | Main system | Main system | ... |
| S2 | Main system | Main system | Main system | Auxiliary IO apparatus | ... |
| S3 | Auxiliary IO apparatus | Auxiliary IO apparatus | Main system | Auxiliary IO apparatus | ... |
| S4 | Auxiliary IO apparatus | Auxiliary IO apparatus | Auxiliary IO apparatus | Auxiliary IO apparatus | ... |
| S5 | Auxiliary IO apparatus | Auxiliary IO apparatus | Auxiliary IO apparatus | Auxiliary IO apparatus | ... |

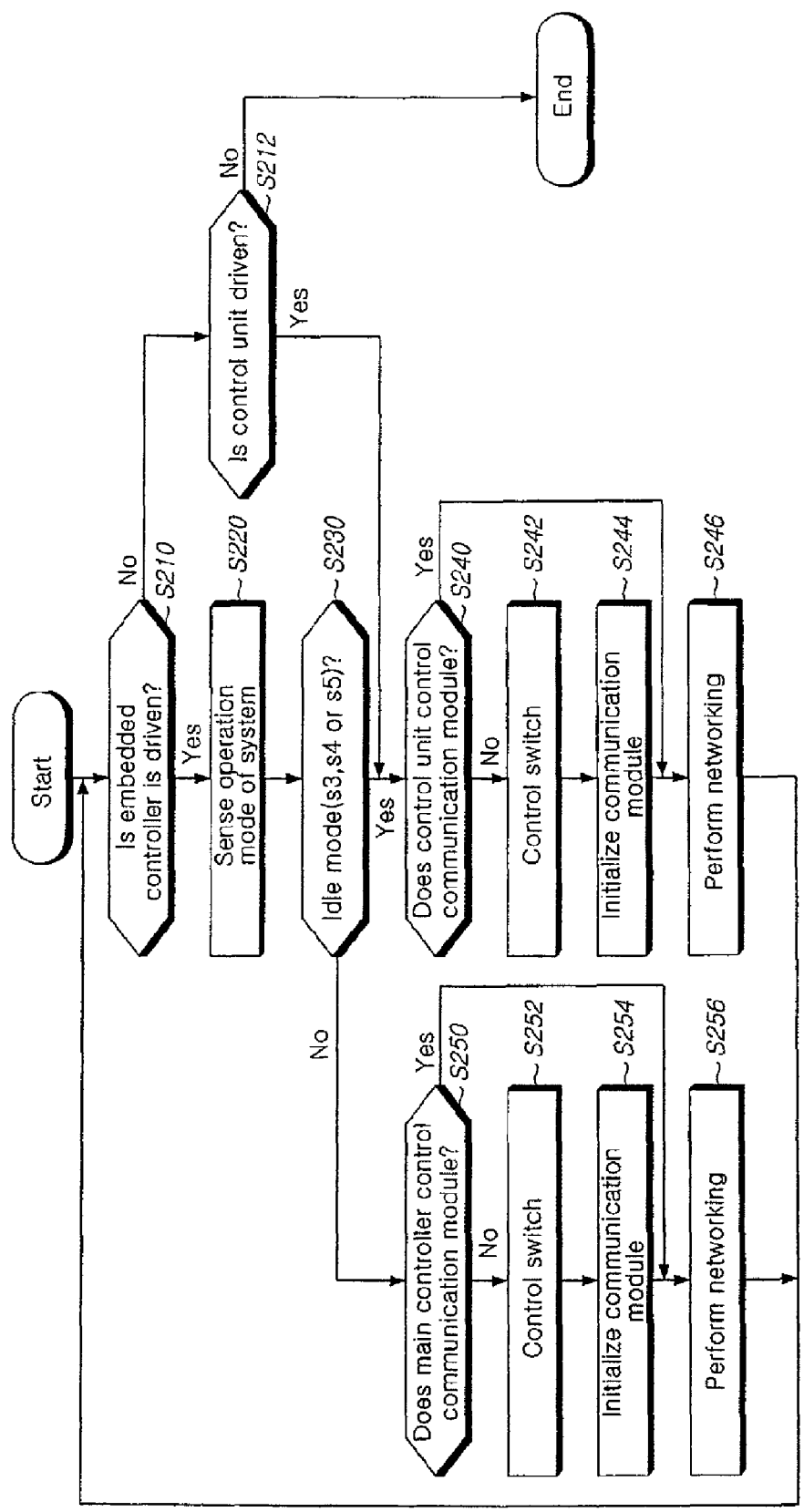

PORTABLE COMPUTER HAVING AUXILIARY IO APPARATUS AND SYSTEM SETUP METHOD THEREOF

CROSS REFERENCE TO RELATED APPLICATIONS

The present application is related to, and claims priority to, Korean patent application 10-2007-0100438, filed on Oct. 5, 2007, the entire contents of which are hereby incorporated by reference.

BACKGROUND OF THE INVENTION

1. Field of the Invention

The present invention relates to a portable computer having an auxiliary IO apparatus, and more particularly, to a method of causing an auxiliary IO apparatus to recognize various types of peripheral modules provided to a portable computer and performing operations using the peripheral modules.

2. Description of the Related Art

In the related art, a conventional portable computer is provided with an output unit including a liquid crystal display (LCD) window and a speaker provided inside a cover of a main body of the portable computer. Thus, to perform the operations through the portable computer, the entire portable computer should be driven, and the display window is driven even when an operation that does not require displaying is performed.

Recently, a portable computer employing an LCD at a portion of a cover of the portable computer to perform basic operations has been placed on the market.

However, the aforementioned related art has following problems.

The conventional portable computer having an auxiliary IO apparatus does not have a control right for various types of peripheral modules provided to the portable computer. That is, since there is limitation on the use of the auxiliary IO apparatus even when a central processing unit (CPU) of the portable computer does not control the modules, the utility of the auxiliary IO apparatus may be lowered.

SUMMARY OF THE INVENTION

The present invention is conceived to solve the aforementioned problems. Accordingly, an object of the present invention is to provide a portable computer having an auxiliary IO apparatus, wherein when a main system of the portable computer does not use a peripheral module, a system of the auxiliary IO apparatus can use the peripheral module to execute a user command.

Another object of the present invention is to provide a portable computer having an auxiliary IO apparatus, wherein a main system and a system of the auxiliary IO apparatus can alternately use peripheral modules, which are provided to the portable computer, depending on states of the systems.

According to an aspect of the present invention, there is provided a portable computer having an auxiliary IO apparatus, comprising a main controller for controlling the portable computer; a peripheral module for performing an individual function of the portable computer; an embedded controller (EC) for sensing an operation mode of the portable computer from a BIOS to determine a control subject of the peripheral module in accordance with the operation mode; and an auxiliary IO apparatus that is driven by its own operating system (OS) and has a control unit for setting up a control right for the peripheral module in accordance with a control signal of the EC.

The peripheral module may include any one or more of a communication module, a data storage module and an audio output module.

The peripheral module may be a communication module, and the portable computer may further comprise a first switch for selectively switching connection of the communication module; a first interface for connecting the EC to the control unit; and a second interface for connecting the first switch to the control unit.

The first interface may be a general purpose input/output (GPIO) port, and the second interface may be a universal serial bus (USB).

If the operation mode is a mode in which power supply to the communication module is cut off as specified in the ACPI power management standard, the EC may transmit a control signal such that the control unit has a control right for the communication module.

The peripheral module may be a data storage module (HDD), and the portable computer may further comprise a third interface for connecting the data storage unit to the control unit.

If the operation mode is a mode in which power supply to a random access memory (RAM) is cut off as specified in the ACPI power management standard, the EC may transmit a control signal such that the control unit has a control right for the data storage module.

The peripheral module may be an audio output module, and the portable computer may further comprise a second switch for selectively switching connection of the audio output module.

If the operation mode is a sleep mode as specified in the ACPI power management standard, the EC may transmit a control signal such that the control unit has a control right for the audio output module.

According to another aspect of the present invention, there is provided a portable computer having an auxiliary IO apparatus driven by its own OS, wherein the auxiliary IO apparatus sets up a control right for a peripheral module for performing an individual function in accordance with an operation mode of the portable computer.

The operation mode may be an operation mode specified in the ACPI power management standard.

An EC provided to the portable computer may determine whether the control right is set up or changed, and the EC may read a control subject from a lookup table in which a control subject of each operation mode is specified for each peripheral module, so as to determine whether the control right is set up.

According to a further aspect of the present invention, there is provided a portable computer having an auxiliary IO apparatus driven by its own OS, wherein the auxiliary IO apparatus senses an operation mode of the portable computer and sets up a control right for a peripheral module of the portable computer in accordance with the operation mode.

The control right for each operation mode may be determined by reading a lookup table in which a control subject of each operation mode is specified for each peripheral module.

According to a further aspect of the present invention, there is provided a system setup method of a portable computer having an auxiliary IO apparatus, comprising the steps of: (A) sensing a change of an operation mode in the portable computer; (B) searching for a peripheral module that is to be subjected to switching of a control system in accordance with the change of the operation mode; (C) if a control right for a corresponding peripheral module searched for in step (B) is set up, releasing the control right that has been set up; and (D) allowing a new control system to set up a new control right for the corresponding peripheral module.

When the peripheral module is a communication module, the switching of the control system may allow a main controller of the portable computer to have the control right if the operation mode is a mode in which power is supplied to the communication module, and the switching of the control system allows a control unit of the auxiliary IO apparatus to have the control right if the operation mode is a mode in which power supply to the communication module is cut off.

Step (C) may be performed by switching connection of a first switch connected to the communication module.

When the peripheral module is a data storage module, the switching of the control system may allow the control unit of the auxiliary IO apparatus to have the control right if the operation mode is a mode in which power supply to a RAM is cut off. When the peripheral module is an audio output module, the switching of the control systems may allow the control unit of the auxiliary IO apparatus to have the control right if the operation mode is a sleep mode in accordance with the ACPI power management standard.

As described above, in a portable computer having an auxiliary IO apparatus according to the present invention, the following advantages can be expected:

Since the auxiliary IO apparatus can set up a control right for a peripheral module provided to the portable computer and can use the peripheral module, the application range of the auxiliary IO apparatus can be expanded.

Since any one of the main system and the system of the auxiliary IO apparatus has a control right for a peripheral module considering an operation mode of the main system when the auxiliary IO apparatus controls the peripheral module, it is possible to prevent conflict of rights to control the peripheral module between the systems, and the application range of the peripheral module can be expanded.

BRIEF DESCRIPTION OF THE DRAWINGS

The above and other objects, features and advantages of the present invention will become apparent from the following description of preferred embodiments given in conjunction with the accompanying drawings, in which:

FIG. 4 is a view illustrating an example of a lookup table employed in an embodiment of the present invention;

FIG. 5 is a flowchart specifically illustrating a system setup method of the portable computer and the auxiliary IO apparatus when a peripheral module is a communication module according to an embodiment of the present invention.

DETAILED DESCRIPTION OF THE INVENTION

Hereinafter, a portable computer 100 having an auxiliary IO apparatus 200 according to the present invention will be described in detail with reference to the accompanying drawings.

Figure 1:
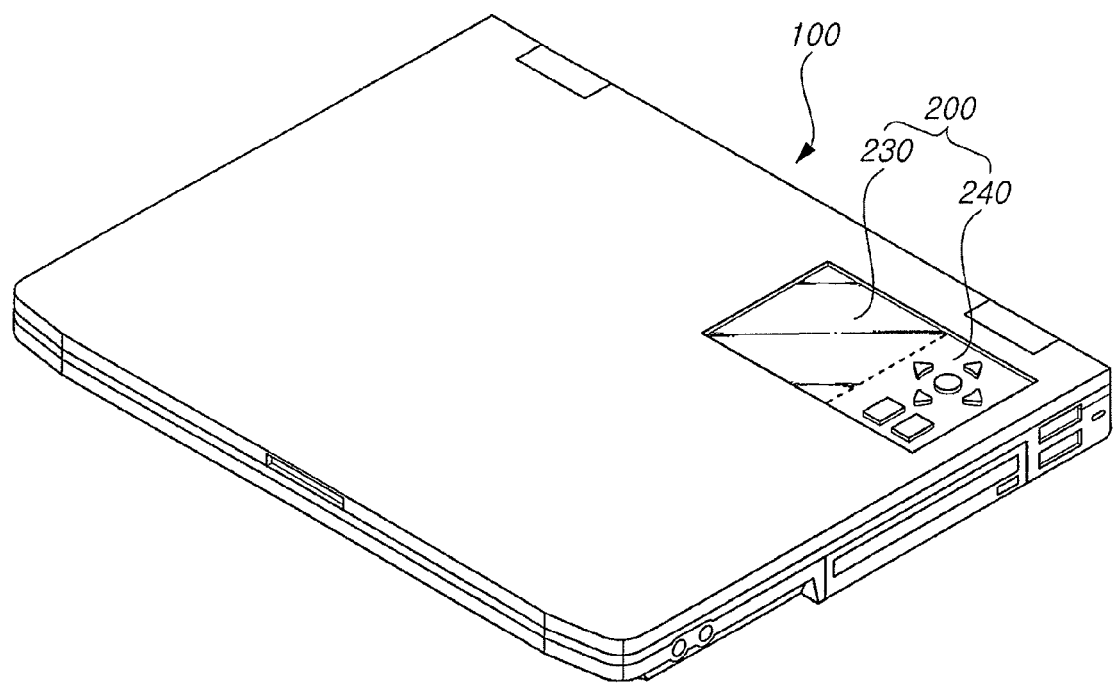
FIG. 1 is a perspective view showing an appearance of a portable computer having an auxiliary IO apparatus according to an embodiment of the present invention.
Figure 2:
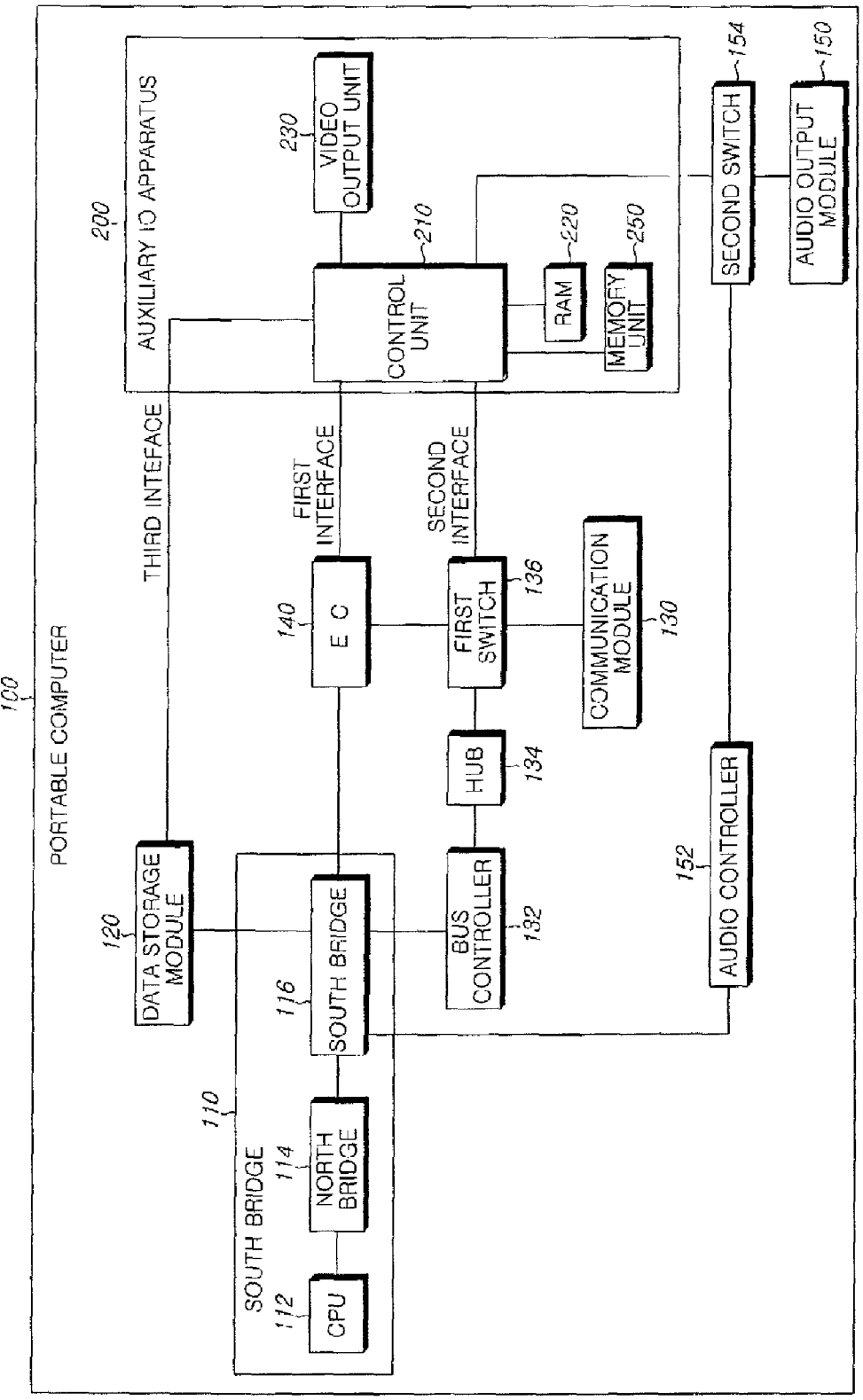
FIG. 2 is a block diagram of a portable computer having an auxiliary IO apparatus according to the embodiment of the present invention.

FIG. 1 is a perspective view showing an appearance of a portable computer 100 having an auxiliary IO apparatus 200 according to an embodiment of the present invention, and FIG. 2 is a block diagram of the portable computer 100 having the auxiliary IO apparatus 200 according to the embodiment of the present invention.

As shown in FIG. 1, the portable computer 100 according to the present invention has the auxiliary IO apparatus 200 provided at one side of an outer surface thereof. The auxiliary IO apparatus 200 includes a display window 230 (a video output unit) and an input unit 240 for receiving a user's input.

At this time, the display window 230 and the input unit 240 may be separately provided as shown in FIG. 1, or a touch screen for simultaneously performing input and output operations may be provided.

Hereinafter, the configuration of the portable computer 100 according to the embodiment of the present invention will be described in detail with reference to FIG. 2. The portable computer 100 according to the embodiment of the present invention is provided with a main controller 110.

The main controller 110 is a unit for driving the portable computer 100 and controlling operations of the portable computer 100. Practically, the main controller 110 includes a central processing unit (CPU) 112 of the portable computer 100 and north and south bridges 114 and 116 for transmitting control signals to various types of peripheral modules of the portable computer 100.

Here, the peripheral module refers to a modularized unit for performing an individual function in the portable computer 100. The peripheral module may include units such as a wire/wireless communication module 130, a hard disk, various types of storage memories and a speaker. Further, the peripheral module may further include external devices, such as a keyboard and a mouse, connected through a connection port such as a USB port in a broad sense.

Since the CPU 112, the north bridge 114 and the south bridge 116 are well-known components of a computer, they will not be described in detail herein.

Meanwhile, a data storage module 120 for storing data of the portable computer 100 is connected to the main controller 110. The data storage module 120 generally includes a hard disk drive (HDD), and various types of data used in the portable computer 100, e.g., mail documents transmitted from e-mail applications, multimedia files and the like, are stored in the data storage module 120.

The portable computer 100 is provided with a communication module 130 for enabling the portable computer 100 to communicate with the outside. Although a wire/wireless LAN module is representative of the communication module 130, another type of known communication module may be used as the communication module 130.

If an application to be executed is based on connection to a website, the communication module 130 is a connection means for connecting to the website.

As shown in FIG. 2, the communication module 130 is connected to the main controller 110 via a USB controller 132, a hub 134 and a first switch 136. The first switch 136 is a unit for connecting the communication module 130 to any one of the main controller 110 and a control unit 210 which will be described later.

Meanwhile, an embedded controller (EC) 140 is connected to the main controller 110. The EC 140 is a unit for sensing an operation mode of the portable computer 100 to set and change a control right for a peripheral module provided to the portable computer 100.

That is, as shown in FIG. 2, the EC 140 is connected to the first switch 136 to control connection of the communication module 130. Thus, the EC 140 checks a system mode from the system BIOS and operates the first switch 136 in accordance with the system mode, thereby connecting the communication module 130 to the main controller 110 or the control unit 210 that will be described later.

Meanwhile, the operation mode is a mode specified in the ACPI power management standard, and operation modes required in the present invention refer to modes S0 to S5 in state G1.

Since descriptions of respective states of modes S0 to S5 are well-known in the art, they will not be described in detail herein (See the ACPI standard).

An audio output module 150 for outputting audio signals is connected to the main controller 110. The audio output module 150 generally includes a speaker. As shown in FIG. 2, the audio output module 150 is connected to the main controller 110 via an audio controller 152 and a second switch 154.

The audio controller 152 is a unit for providing audio signals to the audio output module 150, and the second switch 154 is a unit for connecting the audio output module 150 to any one of the main controller 110 and the control unit 210.

Meanwhile, the portable computer 100 according to the embodiment of the present invention is provided with an auxiliary IO apparatus 200 driven by its own operating system (OS).

As shown in FIG. 2, the auxiliary IO apparatus 200 includes the control unit 210 for driving and controlling the auxiliary IO apparatus 200.

The control unit 210 receives an execution command inputted by a user and then executes a corresponding application, thereby executing the execution command. That is, the control unit 210 performs an operation for executing the corresponding application in accordance with the execution command.

The control unit 210 is connected to the EC 140 by a first interface. Here, a general purpose input/output (GPTO) port is used as the first interface.

The control unit 210 receives control right information on the peripheral modules using the first interface. When a peripheral module acquires the control right, the control unit 210 performs initialization for the corresponding module to set up the control right of the corresponding peripheral module.

To this end, the control unit 210 is connected to the communication module 130. That is, the control unit 210 is connected to the first switch 136 by a second interface and connected to the communication module 130 via the first switch 136.

Here, the second interface is a universal serial bus (USB).

However, an interface is determined depending on a peripheral module connected thereto, and an interface different from the aforementioned interface may be applied.

The control unit 210 is connected to the data storage module 120 by a third interface. This is because the control unit 210 should also be able to set up a control right for the data storage module 120 by control of the EC 140.

The second switch 154 is connected to the control unit 210 to control the audio output module 150 to be connected to the main controller 110 or the control unit 210 depending on an operation mode of the portable computer 100.

Meanwhile, a random access memory (RAM) 220 is connected to the control unit 210. The RAM 220 is a unit for providing a temporary storage space required for driving the control unit 210.

As described above in connection with FIG. 1, the auxiliary IO apparatus 200 includes the video output unit 230.

Meanwhile, the auxiliary IO apparatus 200 according to the present invention includes a memory unit 250 as shown in FIG. 2.

Hereinafter, the operation of the present invention will be described in detail in accordance with a system setup method of the portable computer 100 having the auxiliary IO apparatus 200.

Figure 3:
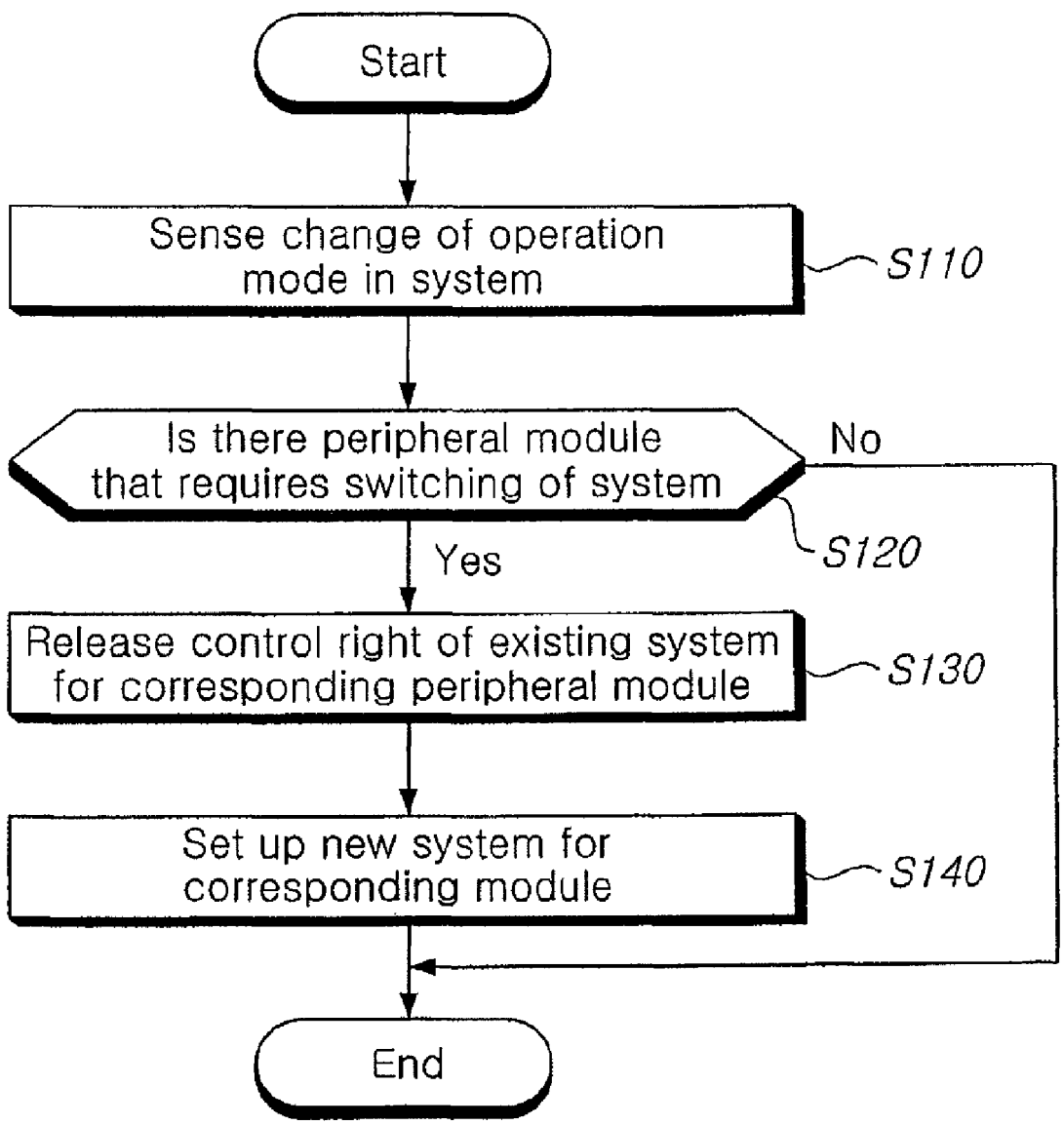
FIG. 3 is a flowchart illustrating a system setup method of the portable computer and the auxiliary IO apparatus according to an embodiment of the present invention.
Figure 6:
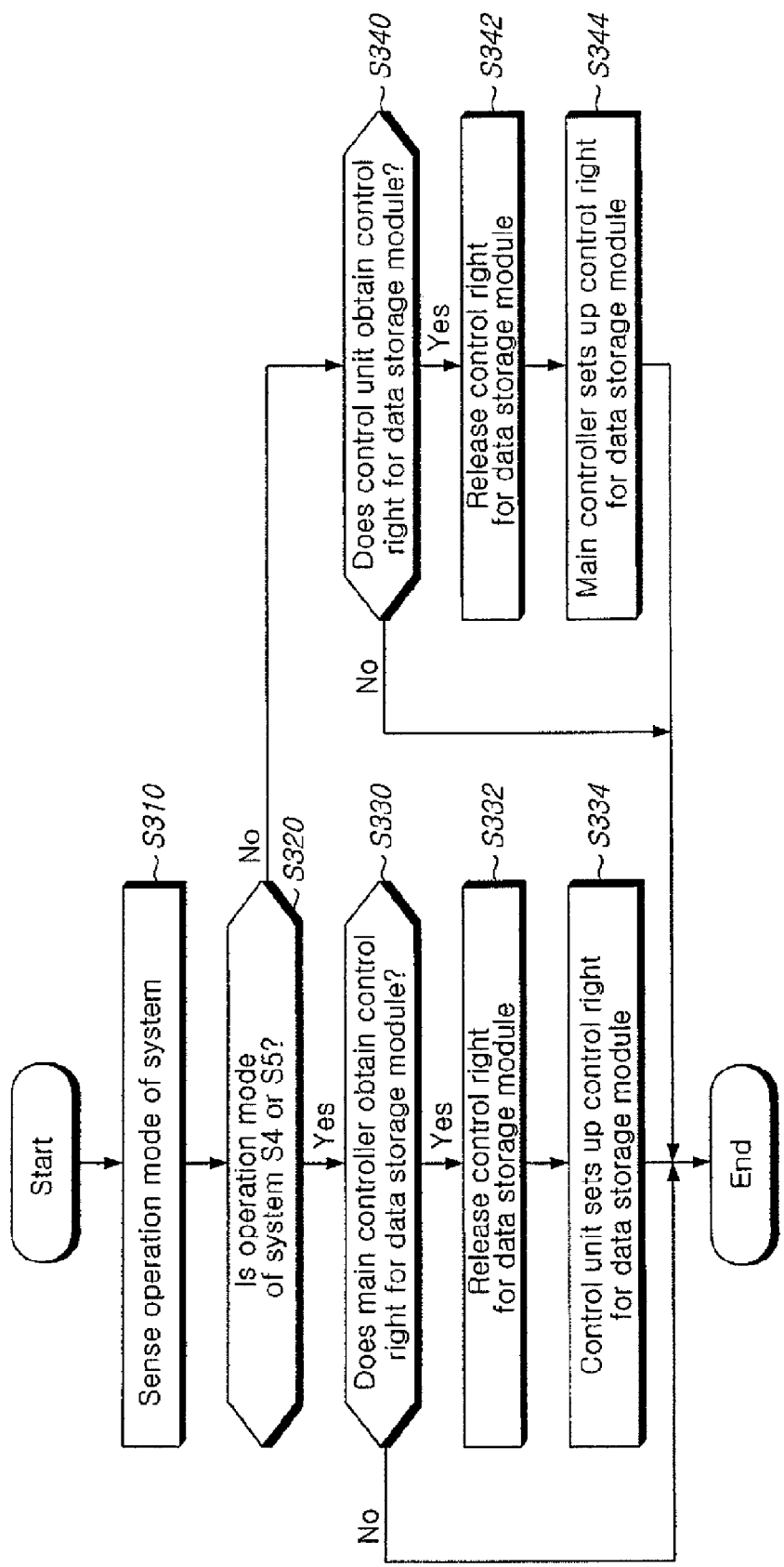
FIG. 6 is a flowchart specifically illustrating a system setup method of the portable computer and the auxiliary IO apparatus when the peripheral module is a data storage module according to an embodiment of the present invention.

FIG. 3 is a flowchart illustrating a system setup method of the portable computer 100 and the auxiliary IO apparatus 200 according to an embodiment of the present invention. FIG. 4 is a view illustrating an example of a lookup table employed in an embodiment of the present invention. FIG. 5 is a flowchart specifically illustrating a system setup method of the portable computer 100 and the auxiliary IO apparatus 200 when a peripheral module is a communication module 130 according to an embodiment of the present invention. FIG. 6 is a flowchart specifically illustrating a system setup method of the portable computer 100 and the auxiliary IO apparatus 200 when the peripheral module is a data storage module 120 according to a preferred embodiment of the present invention.

As shown in these figures, the portable computer 100 having the auxiliary IO apparatus 200 according to the present invention senses a state of a main system of the portable computer 100. If the main controller 110 of the portable computer 100 enters into a mode in which the main controller 110 does not control a peripheral module, a control right for the peripheral module is transferred to the control unit 210 of the auxiliary IO apparatus 200. If the main system again enters into a mode in which the main controller 110 should obtain a control right for the peripheral module, the control right for the peripheral module is transferred to the main controller 110. That is, the main controller 110 or the control unit 210 sets up the control right for the peripheral module depending on a mode of the main system.

At this time, a specific method of setting up a control right may be changed depending on each peripheral module. For example, the communication module 130 is disconnected from either of the main controller 110 or the control unit 210 and connected to either of them for which a new control right is set up through an operation of a physical switch. Then, the control right is set up by performing initialization for the communication module 130 and recognizing the communication module 130.

Connection of the audio output module 150 is also newly set up using a physical switch in the same manner as the communication module 130.

Meanwhile, the switch is used to prevent the peripheral module from being simultaneously used by two systems. If one peripheral module is allowed to be simultaneously used by two systems, a switch is not applied to the peripheral module.

For example, in case of the data storage module 120, the control unit 210 may read data from the data storage module 120 in a state where the main controller 110 has a control right. Thus, the data storage module 120 is not connected to a switch, and only a new control right is set up by a control signal.

A system setup method of the portable computer 100 and the auxiliary IO apparatus 200 according to an embodiment of the present invention will be described with reference to FIG. 3. First, the EC 140 senses an operation mode of the portable computer 100 (S110). The operation mode is detected from the BIOS of the portable computer 100 by the EC 140. Considering state G1 shown in the ACIP power management standard, the operation mode may be divided into modes S0 to S5.

At this time, the EC 140 senses a change of the operation mode. That is, if the operation mode is not changed, the state of a control right currently set up is maintained.

If the operation mode is changed, it is determined whether there exists a peripheral module that requires switching of systems (i.e., transfer of a control right) in accordance with the changed operation mode (S120).

The determination may be performed by reading a lookup table in which a control subject of each operation mode is set up for each peripheral module. Values set in the lookup table may be modified by a user's setup, and an example of the lookup table is shown in FIG. 4. As shown in this figure, if the operation mode is mode S0, the main system (the main controller 110) has a control right for all the peripheral modules. However, if the operation mode is changed to mode S2 via mode S1, the auxiliary IO apparatus 200 (the control unit 210) obtains a control right for the audio output module 150 (the speaker). If the operation mode is changed to mode S3, the auxiliary IO apparatus 200 obtains a control right for the wire/wireless communication module 130, and if the operation mode is changed to mode S4, the auxiliary IO apparatus 200 also obtains a control right for the data storage module 120 (the HDD).

As described above, this is only an example of setting up the operation mode, and the setup values may be differently set by a user or manufacturer.

Thereafter, if there is a peripheral module that requires transfer of a control right, the control right of an existing system for the corresponding peripheral module is released (S130). The release may be performed by a control signal or may be performed together with a physical method using a switch.

A new system sets up a control right for the corresponding peripheral module (S140). At this time, the new system refers to a system including the main controller 110 or the control unit 210, for which a control right is not set up.

Hereinafter, a specific transfer method when the peripheral module is the communication module 130 will be described in detail with reference to FIG. 5.

As shown in FIG. 5, when the peripheral module is the communication module 130, it is determined whether the EC 140 is driven (S210).

If the EC 140 is not driven, it is determined whether the control unit 210 of the auxiliary IO apparatus 200 is driven (S212).

If the control unit 210 is not also driven, the execution of the present invention is finished to prevent the present invention from being executed when the portable computer 100 is not operated.

Meanwhile, if the EC 140 is driven, an operation mode of a system is sensed through the EC 140 (S220).

Then, it is determined whether the operation mode is one of modes S3 to S5 (hereinafter, referred to as an "idle mode") (S230). This is because the control unit 210 sets up a control right for the communication module 130 if the operation mode is an idle mode.

Thus, if the operation mode is an idle mode, it is determined whether the control unit 210 has the control right for the communication module 130 (S240). If the control unit 210 does not have the control right for the communication module 130, the EC 140 operates the first switch 136 to connect the communication module 130 to the control unit 210 (S242).

Thereafter, the control unit 210 performs initialization for the communication module 130 to set up the control right for the communication module 130 (S244).

The control unit 210 performs networking using the communication module 130 (S246). If it is determined in step S240 that the control unit 210 has the control right for the communication module 130, step S246 is immediately performed.

Meanwhile, if it is determined in step S230 that the operation mode is not all idle mode, it is determined whether the main controller 110 has the control right for the communication module 130 (S250). If the main controller 110 does not have the control right for the communication module 130, the EC 140 operates the first switch 136 to connect the communication module 130 to the main controller 110 (S252).

Thereafter, the main controller 110 performs initialization for the communication module 130 to set up the control right for the communication module 130 (S254).

Then, the main controller 110 performs networking using the communication module 130 (S256). If it is determined in step S250 that the main controller 110 has the control right for the communication module 130, step S256 is immediately performed.

After performing step S246 or S256, the aforementioned steps are repeatedly performed again from step S210.

Meanwhile, step S240 is performed because the operation mode is an idle mode if it is determined in step S212 that the control unit 210 is driven, i.e., if the EC 140 is not driven but only the control unit 210 is driven.

FIG. 6 shows a detailed flowchart of the present invention when the peripheral module is the data storage module 120.

As shown in this figure, when the peripheral module is the data storage module 120, the EC 140 first senses an operation mode of a system (S310).

Then, it is determined whether the sensed operation mode is mode S4 or S5 (S320).

If it is determined in step S320 that the operation mode is mode S4 or S5, it is determined whether the main controller 110 has a control right for the data storage module 120 (S330).

At this time, if it is determined in step S330 that the main controller 110 has the control right for the data storage module 120, the control right for the data storage module 120 is released from the main controller 110 (S332), and the control unit 210 sets up the control right for the data storage module 120 (S334).

However, if it is determined in step S330 that the main controller 110 does not have the control right for the data storage module 120 (when the control unit 210 has the control right for the data storage module 120), a new control right is not set up.

Meanwhile, if it is determined in step S320 that the operation mode is neither mode S4 nor S5 (when the operation mode is one of modes S0 to S3), it is determined whether the control unit 210 has the control right for the data storage module 120 (S340).

At this time, if it is determined in step S340 that the control unit 210 has the control right for the data storage module 120, the control right for the data storage module 120 is released from the control module 210 (S342), and the main controller 110 sets up the control right for the data storage module 120 (S344).

However, if it is determined in step S340 that the control unit 210 does not have the control right for the data storage module 120 (when the main controller 110 has the control right for the data storage module 120), a new control right is not set up as well.

The aforementioned embodiment illustrates a detailed process for a specific peripheral module, and it will be apparent that the process may be changed depending on each peripheral module.

It will be apparent that the scope of the present invention is not limited to the embodiments described above but defined by the appended claims, and that those skilled in the art can make various modifications and adaptations within the scope of the present invention defined by the claims.

What is claimed is:

1. A portable computer, comprising:
an auxiliary Input/Output (IO) apparatus;
a main controller configured to control the portable computer;
a peripheral module configured to perform an individual function of the portable computer;
an auxiliary Input/Output (IO) apparatus including a control unit configured to selectively control the peripheral module and being driven by its own operating system (OS); and
an embedded controller (EC) configured to sense an operation mode of the portable computer from a Basic Input/Output System (BIOS) and to determine whether the main controller or the control unit of the auxiliary IO apparatus is to control the peripheral apparatus based on the sensed operation mode the of the portable computer,
wherein the peripheral module is a communication module, and
wherein if the EC senses the operation mode is a mode in which power supply to the communication module is cut off as specified in the Advanced Configuration and Power Interface (ACPI) power management standard, the EC determines the control unit of the auxiliary IO apparatus is to control the communication module, controls the first switch to connect the control unit of the auxiliary IO apparatus to the communication module, and sends a control signal to the control unit of the auxiliary IO apparatus to control the communication module.

2. The portable computer of claim 1,
wherein the portable computer further comprises:
a first switch configured to selectively switch connection of the communication module;
a first interface configured to connect the EC to the control unit of the auxiliary IO apparatus; and
a second interface configured to connect the first switch to the control unit of auxiliary IO apparatus.

3. The portable computer of claim 2, wherein the first interface is a general purpose input/output (GPIO) port, and the second interface is a universal serial bus (USB).

4. A portable computer, comprising:
an auxiliary Input/Output (IO) apparatus;
a main controller configured to control the portable computer;
a peripheral module configured to perform an individual function of the portable computer;
an auxiliary Input/Output (IO) apparatus including a control unit configured to selectively control the peripheral module and being driven by its own operating system (OS); and
an embedded controller (EC) configured to sense an operation mode of the portable computer from a Basic Input/Output System (BIOS) and to determine whether the main controller or the control unit of the auxiliary IO apparatus is to control the peripheral apparatus based on the sensed operation mode the of the portable computer,
wherein the peripheral module is a data storage module including a random access memory (RAM), and
wherein if the EC senses the operation mode is a mode in which power supply to a the random access memory (RAM) is cut off as specified in the Advanced Configuration and Power Interface (ACPI) power management standard, the EC determines the control unit of the auxiliary IO apparatus is to control the data storage module, and sends a control signal to the control unit of the auxiliary IO apparatus to control the data storage module.

5. The portable computer of claim 4, wherein the portable computer further comprises an interface configured to connect the data storage module to the control unit auxiliary IO apparatus.

6. A portable computer, comprising:
an auxiliary Input/Output (IO) apparatus;
a main controller configured to control the portable computer;
a peripheral module configured to perform an individual function of the portable computer;
an auxiliary Input/Output (IO) apparatus including a control unit configured to selectively control the peripheral module and being driven by its own operating system (OS); and
an embedded controller (EC) configured to sense an operation mode of the portable computer from a Basic Input/Output System (BIOS) and to determine whether the main controller or the control unit of the auxiliary IO apparatus is to control the peripheral apparatus based on the sensed operation mode the of the portable computer,
wherein the peripheral module includes a data storage module, a communication module and an audio output module, and
wherein the portable computer further comprises:
a first switch disposed between the communication module and the EC and between the main controller and the control unit of the auxiliary IO apparatus and configured to selectively switch connection of the communication module between the main controller and the control unit of the auxiliary IO apparatus;
a first interface configured to connect the EC to the control unit of the auxiliary IO apparatus;
a second interface configured to connect the first switch to the control unit of the auxiliary IO apparatus;
a third interface configured to connect the data storage unit to the control unit of the auxiliary IO apparatus; and
a second switch disposed between the control unit of the auxiliary IO apparatus and the audio output module and between the main controller and the audio output module and configured to selectively switch connection of the audio output module, and
wherein when the EC determines the control unit of the auxiliary IO apparatus is to control the communication module, the EC controls the first switch to connect the control unit of the auxiliary IO apparatus to the communication module and sends a control signal to the control unit of the auxiliary IO apparatus to control the communication module, and when the EC determines the control unit of the auxiliary IO apparatus is to control the data storage module, the EC sends a control signal to the control unit of the auxiliary IO apparatus to control the data storage module, and when the EC determines the control unit of the auxiliary IO apparatus is to control the audio output module, the EC controls the second switch to connect the control unit of the auxiliary IO apparatus to the audio output module and sends a control signal to the control unit of the auxiliary IO apparatus to control the audio output module.

7. A method of controlling a portable computer, the method comprising:
 sensing an operation mode of the portable computer from a Basic Input/Output System (BIOS);
 determining whether a main controller that controls the portable computer or a control unit of an auxiliary IO apparatus of the portable computer is to control a peripheral apparatus that performs an individual function of the portable computer based on the sensed operation mode the of the portable computer; and
 selectively switching a connection of a communication module functioning as the peripheral apparatus of the portable computer,
 wherein when the sensing step senses the operation mode is a mode in which power supply to the communication module is cut off as specified in the Advanced Configuration and Power Interface (ACPI) power management standard, the determining step determines the control unit of the auxiliary IO apparatus is to control the communication module, and the selectively switching step connects the control unit of the auxiliary IO apparatus to the communication module, and
 wherein the method further comprises sending a control signal to the control unit of the auxiliary IO apparatus to control the communication module.

8. A method of controlling a portable computer, the method comprising:
 sensing an operation mode of the portable computer from a Basic Input/Output System (BIOS); and
 determining whether a main controller that controls the portable computer or a control unit of an auxiliary IO apparatus of the portable computer is to control a peripheral apparatus that performs an individual function of the portable computer based on the sensed operation mode the of the portable computer,
 wherein the peripheral module is a data storage module including a random access memory (RAM), and
 wherein when the sensing step senses the operation mode is a mode in which power supply to the random access memory (RAM) is cut off as specified in the Advanced Configuration and Power Interface (ACPI) power management standard, the determining step determines the control unit of the auxiliary IO apparatus is to control a data storage module functioning as the peripheral module, and
 wherein the method further comprises sending a control signal to the control unit of the auxiliary IO apparatus to control the data storage module.

9. A method of controlling a portable computer, the method comprising:
 sensing an operation mode of the portable computer from a Basic Input/Output System (BIOS); and
 determining whether a main controller that controls the portable computer or a control unit of an auxiliary IO apparatus of the portable computer is to control a peripheral apparatus that performs an individual function of the portable computer based on the sensed operation mode the of the portable computer,
 wherein the peripheral module includes a data storage module, a communication module and an audio output module, and
 wherein the portable computer further comprises:
 a first switch disposed between the communication module and the EC and between the main controller and the control unit of the auxiliary IO apparatus and configured to selectively switch connection of the communication module between the main controller and the control unit of the auxiliary IO apparatus;
 a first interface configured to connect the EC to the control unit of the auxiliary IO apparatus;
 a second interface configured to connect the first switch to the control unit of the auxiliary IO apparatus;
 a third interface configured to connect the data storage unit to the control unit of the auxiliary IO apparatus; and
 a second switch disposed between the control unit of the auxiliary IO apparatus and the audio output module and between the main controller and the audio output module and configured to selectively switch connection of the audio output module, and
 wherein when the EC determines the control unit of the auxiliary IO apparatus is to control the communication module, the EC controls the first switch to connect the control unit of the auxiliary IO apparatus to the communication module and sends a control signal to the control unit of the auxiliary IO apparatus to control the communication module, and when the EC determines the control unit of the auxiliary IO apparatus is to control the data storage module, the EC sends a control signal to the control unit of the auxiliary IO apparatus to control the data storage module, and when the EC determines the control unit of the auxiliary IO apparatus is to control the audio output module, the EC controls the second switch to connect the control unit of the auxiliary IO apparatus to the audio output module and sends a control signal to the control unit of the auxiliary IO apparatus to control the audio output module.

* * * * *